United States Patent
Enomoto et al.

(10) Patent No.: US 9,472,796 B2
(45) Date of Patent: Oct. 18, 2016

(54) STACKED SECONDARY BATTERY WITH SEPARATOR BETWEEN ELECTRODES

(75) Inventors: Shinsuke Enomoto, Sagamihara (JP); Tomokazu Kumeuchi, Sagamihara (JP)

(73) Assignee: NEC ENERGY DEVICES, LTD., Sagamihara-shi (JP)

( * ) Notice: Subject to any disclaimer, the term of this patent is extended or adjusted under 35 U.S.C. 154(b) by 239 days.

(21) Appl. No.: 13/821,893

(22) PCT Filed: Sep. 9, 2011

(86) PCT No.: PCT/JP2011/070620
§ 371 (c)(1),
(2), (4) Date: Mar. 8, 2013

(87) PCT Pub. No.: WO2012/036088
PCT Pub. Date: Mar. 22, 2012

(65) Prior Publication Data
US 2013/0171497 A1    Jul. 4, 2013

(30) Foreign Application Priority Data
Sep. 16, 2010    (JP) ................................. 2010-207924

(51) Int. Cl.
*H01M 2/18*    (2006.01)
*H01M 10/42*    (2006.01)
(Continued)

(52) U.S. Cl.
CPC ............... *H01M 2/18* (2013.01); *H01M 2/145* (2013.01); *H01M 4/139* (2013.01);
(Continued)

(58) Field of Classification Search
None
See application file for complete search history.

(56) References Cited

U.S. PATENT DOCUMENTS

2011/0274960 A1*    11/2011   Ahn ............................... 429/136

FOREIGN PATENT DOCUMENTS

CN       201146222 Y        11/2008
GB           744099 A    *    2/1956    ............. H01M 2/18
(Continued)

OTHER PUBLICATIONS

Communication dated Sep. 26, 2014 from the State Intellectual Property Office of People's Republic of China in counterpart Application No. 201180044534.9.

*Primary Examiner* — Ula C Ruddock
*Assistant Examiner* — Tony Chuo
(74) *Attorney, Agent, or Firm* — Sughrue Mion, PLLC (57) ABSTRACT

The present invention relates to a stacked secondary battery that includes a laminated body, the laminated body including: a first electrode (10) in which a first electrode active material (12) is applied to both surfaces of a sheet-shaped collector (11), the first electrode having a first region (11*a*) to which the first electrode active material has been applied and a second region (11*b*) to which the first electrode active material has not been applied; a second electrode (20) in which a second electrode active material (22) different in polarity from the first electrode active material is applied to both surfaces (21) of a sheet-shaped collector; and a porous separator (30), the first and second electrodes being stacked via the porous separator, the first and second electrodes being stacked via the porous separator. In the stacked secondary battery, there were problems that the active material is shed from the first electrode or the second electrode and passes through the separator, and thus a short circuit between the electrodes occurs during use. The present invention solves the above problems by folding a portion (31) of the porous separator of the stacked secondary battery that faces the second region (11*b*) of the first electrode and the region (22) of the second electrode, to which the second electrode active material has been applied, into a plurality of layers.

4 Claims, 4 Drawing Sheets

(51) Int. Cl.
  *H01M 2/14*     (2006.01)
  *H01M 4/139*    (2010.01)
  *H01M 2/16*     (2006.01)
  *H01M 10/052*   (2010.01)
  *H01M 10/0585*  (2010.01)
  *H01M 10/34*    (2006.01)

(52) U.S. Cl.
  CPC ...... *H01M 10/4235* (2013.01); *H01M 2/1653* (2013.01); *H01M 2/1686* (2013.01); *H01M 10/052* (2013.01); *H01M 10/0585* (2013.01); *H01M 10/345* (2013.01); *Y02T 10/7011* (2013.01); *Y10T 29/49108* (2015.01); *Y10T 29/49115* (2015.01)

(56) References Cited

FOREIGN PATENT DOCUMENTS

| | | | |
|---|---|---|---|
| JP | 10-162804 A | 6/1998 | |
| JP | 10-241737 A | 9/1998 | |
| JP | 2002-208442 A | 7/2002 | |
| JP | 2004-185959 A | 7/2004 | |
| JP | 2005-174779 A | 6/2005 | |
| JP | 2007-141482 * | 6/2007 | ............ H01M 10/40 |
| JP | 2007-141482 A | 6/2007 | |
| JP | 3934888 B2 | 6/2007 | |
| JP | 2007-250319 A | 9/2007 | |
| JP | 2009-123582 A | 6/2009 | |
| JP | 2009-218105 * | 9/2009 | ............ H01M 10/36 |
| JP | 2011-210500 A | 10/2011 | |

* cited by examiner

STACKED SECONDARY BATTERY WITH SEPARATOR BETWEEN ELECTRODES

CROSS REFERENCE TO RELATED APPLICATIONS

This application is a National Stage of International Application No. PCT/JP2011/070620 filed Sep. 9, 2011, claiming priority based on Japanese Patent Application No. 2010-207924 filed Sep. 16, 2010, the contents of all of which are incorporated herein by reference in their entirety.

TECHNICAL FIELD

The present invention relates to a stacked secondary battery.

BACKGROUND ART

Recently, lithium ion batteries are used as a power source for a portable device such as a portable telephone or a digital camera because of requirements for higher capacity and miniaturization. Lithium ion batteries are also used as a power source for power-assisted bicycles or power tools because of their high energy density and because they have no memory effect. Further, stacked lithium ion batteries that includes an electrode having a laminate structure and that use an aluminum laminate film as exterior covering the battery have been commercialized because these batteries provide advantages such as lighter weight and improvement of heat dissipation, and serious research has focused on developing a battery pack or a battery system in which multiple lithium ion batteries are series or parallel connected.

Figure 1A:
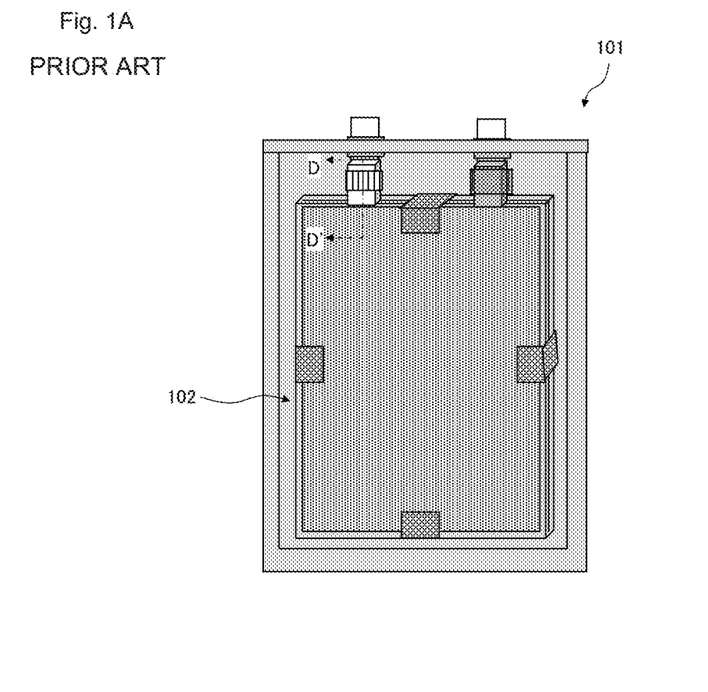
FIG. 1A is a plan view schematically showing a conventional stacked lithium ion secondary battery.
Figure 1B:
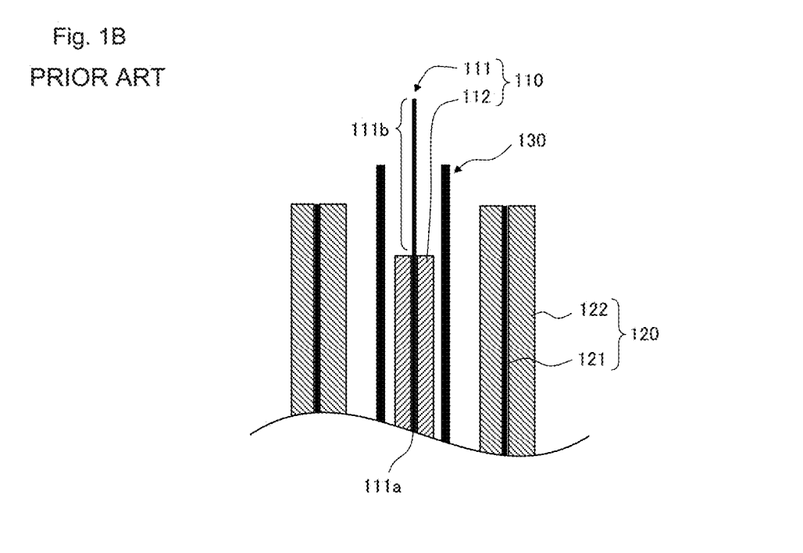
FIG. 1B is a schematic sectional view taken along line D-D' shown in FIG. 1A.

FIG. 1A is a plan view schematically showing a typical stacked secondary battery that includes an aluminum laminate film as an exterior member. FIG. 1B is a schematic view showing a cross section taken along the line D-D' shown in FIG. 1A (and being parallel to a stacking direction), and specifically shows a sectional structure near the collective tab of a conventional stacked secondary battery.

Positive electrode collector 111 includes active material forming region 111a to which positive electrode active material 112 has been applied, and positive electrode collective tab 111b as a region to which positive electrode active material 112 has not been applied. Positive electrode collective tab 111b is projected from the end of active material forming region 111a to be pulled out from active material forming region 111a. Negative electrode 120 also includes a negative electrode collective tab disposed to be pulled out from negative electrode active material 122.

In the case of a lithium ion secondary battery, positive electrode collector 111 is made of aluminum foil, and positive electrode active material 112 is made of lithium-containing oxide such as lithium cobalt oxide, lithium nickel oxide, or lithium manganese oxide. Negative electrode collector 121 is made of copper foil, negative electrode active material 122 is made of carbon, and separator 130 is made of a porous plastic film.

In such a lithium ion secondary battery, a short circuit between the electrodes in the battery is a major problem. The reason for this is that when the electrodes are slightly short-circuited, self-discharge of the battery is accelerated, and that when the electrodes are largely short-circuited, heat is generated, which leads, in the worst case, to the occurrence of smoke or fire, creating a dangerous situation.

A maximum short-circuit current flows between the electrodes when the metals of negative electrode collector (copper foil) 121 and positive electrode collector (aluminum foil) 111 come into contact with each other. However, the stacked secondary battery is designed in such a way that, for structural and manufacturing reasons, such contact will not occur. In other words, positive electrode collector 111 and negative electrode collector 121 are arranged to be spatially separated from each other by separator 130 to prevent internal short circuit.

A region through which current is likely to flow next is a region between positive electrode collector 111 and negative electrode collector 122, i.e., a region where region 111b in which positive electrode collector 111 is exposed faces the negative electrode active material via separator 130. In such a region, there is a possibility that during battery use, due to external factors such as expansion, vibration, or shocks to the electrodes caused by repeated charge and discharge, active materials 112 and 122 will shed from electrodes 110 and 120, and pass through separator 130, thereby generating short circuit between the electrodes. The same phenomenon may occur between negative electrode collector 121 and positive electrode active material 112.

Thus, in the stacked secondary battery, to solve the problem caused by shedding of the active materials, a safer structure must be designed between the electrodes. For example, Patent Literature 1 proposes, in a secondary battery in which electrode elements have winding structures, a method for preventing internal short circuit even when shed active materials pass through the separator by having tape adhere to a region where the positive electrode collector is exposed, i.e., a region that faces the negative electrode active material via the separator. Patent Literature 2 proposes, in a wound secondary battery, a method for preventing internal short circuit, that is caused by shedding of active materials, by heat-treating a porous separator disposed between electrodes so that the separator becomes nonporous

CITATION LIST

Patent Literature

Patent Literature 1: JP 10-241737 A
Patent Literature 2: JP 2007-141482 A

SUMMARY OF INVENTION

Problems to be Solved

However, in the method described in Patent Literature 1, the step of having tape adhere to a region is necessary. Accordingly, when positional shifting occurs while the tape is being made to adhere to a region, the tape must be applied again. In this case, adhesive materials may cause electrode peeling, thus producing a defective product. In the method described in Patent Literature 2, heat treatment of the separator may cause contraction of the separator or generation of wrinkles in the separator. The contracted separator reduces a hole diameter to lower the charge and discharge rate characteristics of the battery, and generates local pressure to be applied to the electrodes. The wrinkles if generated, lead to an ununiform distance between the electrodes. As a result, there has been a problem of a reduction of long-term properties of the battery such as charge and discharge cycle characteristics.

It is therefore an object of the present invention to provide a stacked secondary battery capable of preventing the occurrence of short circuits in a battery while preventing reduction of productivity and deterioration in battery performance.

Solution to Problem

To achieve the object, a stacked secondary battery according to the present invention includes a laminated body, the laminated body including: a first electrode in which a first electrode active material is applied to both surfaces of a sheet-shaped collector, the first electrode having a first region to which the first electrode active material has been applied and a second region to which the first electrode active material has not been applied; a second electrode in which a second electrode active material different in polarity from the first electrode active material is applied to both surfaces of a sheet-shaped collector; and a porous separator, the first and second electrodes being stacked via the porous separator, wherein a portion of the porous separator facing the second region of the first electrode and the region of the second electrode to which the second electrode active material has been applied is folded into a plurality of layers.

A method for manufacturing a stacked secondary battery according to the present invention includes the step of: the steps of: forming a first electrode by applying a first electrode active material to both surfaces of a sheet-shaped collector, the forming the first electrode including forming a first region to which the first electrode active material has been applied and a second region to which the first electrode active material has not been applied; forming a second electrode by applying a second electrode active material different in polarity from the first electrode active material to both surfaces of a sheet-shaped collector; and forming a laminated body by stacking the first and second electrodes via a porous separator, and further includes the step of, before the step of forming the laminated body, folding a portion of the porous separator facing the second region of the first electrode and the region of the second electrode, to which the second electrode active material has been applied, into a plurality of layers.

In such a stacked secondary battery, the porous separator folded into the plurality of layers is disposed between the region of the first electrode to which the first electrode active material has not been applied, i.e., the region in which the collector is exposed, and the region of the second electrode to which the second electrode active material has been applied. Thus, even when shedding of the second electrode active material occurs, the second electrode active material is prevented from reaching the collector of the first electrode by the porous separator folded into the plurality of layers. As a result, without performing the step of having a tape adhere to a region and heat treatment, which may cause a reduction in productivity and a deterioration in battery performance, the occurrence of short circuits between a positive electrode collector and a negative electrode active material caused by shedding of the negative electrode active material can be prevented.

Effects of Invention

As described above, the present invention provides a stacked secondary battery capable of suppressing the occurrence of short circuits in a battery while preventing reduction of productivity and deterioration in battery performance.

DESCRIPTION OF EMBODIMENT

Hereinafter, an embodiment of the present invention will be described with reference to the drawings.

A stacked secondary battery according to the present invention will be described herein by taking the example of a stacked lithium ion secondary battery. In the embodiment described below, a first electrode according to the present invention is a positive electrode, and a second electrode according to the present invention is a negative electrode. In the present invention, the reverse case, specifically, the first electrode is a negative electrode and the second electrode is a positive electrode, can be employed. In this case, there is no positive electrode material that does not face negative electrode material.

Figure 2:
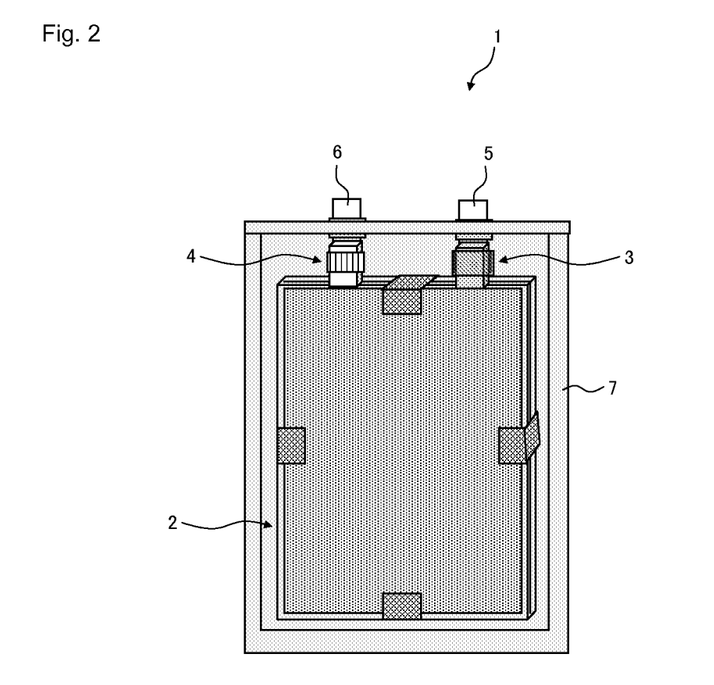
FIG. 2 is a plan view schematically showing a stacked lithium ion secondary battery according to an embodiment of the present invention.
Figure 3A:
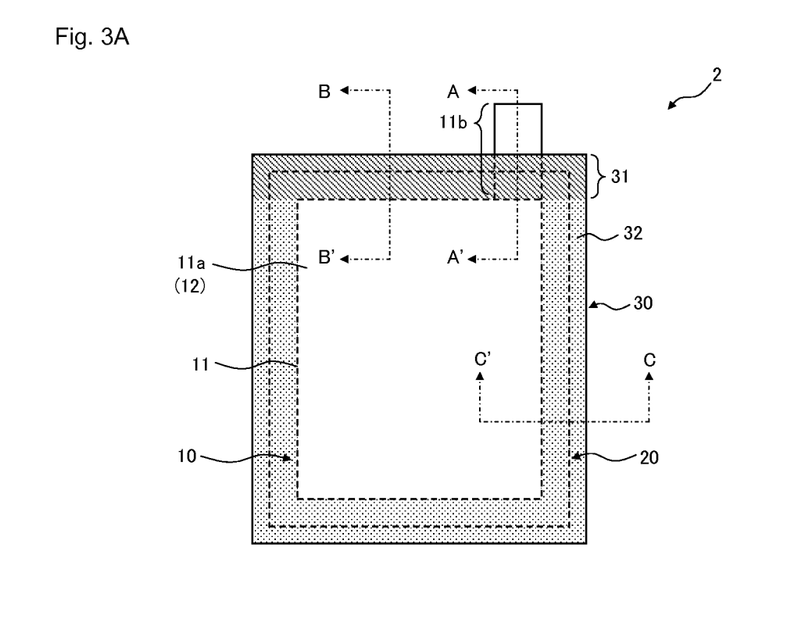
FIG. 3A is a plan view schematically showing the laminated body of the stacked lithium ion secondary battery according to the embodiment of the present invention.
Figure 3B:
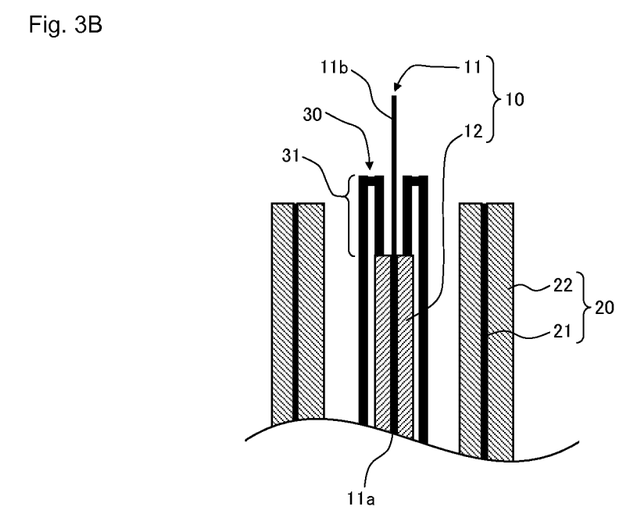
FIG. 3B is a schematic sectional view taken along line A-A' shown in FIG. 3A.
Figure 4A:
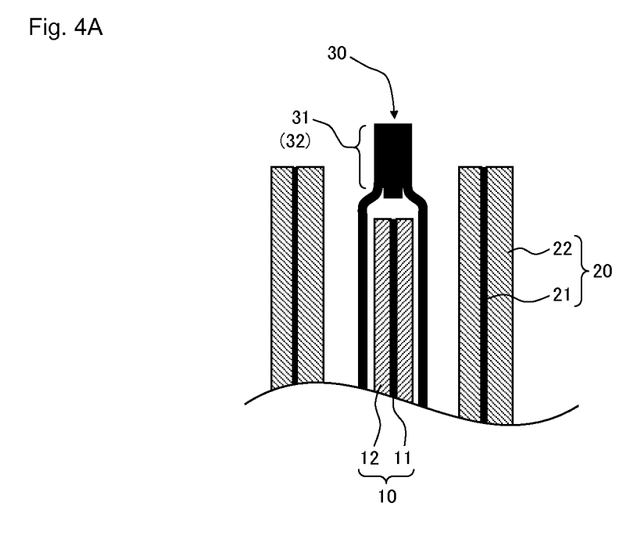
FIG. 4A is a schematic sectional view taken along line B-B' shown in FIG. 3A.
Figure 4B:
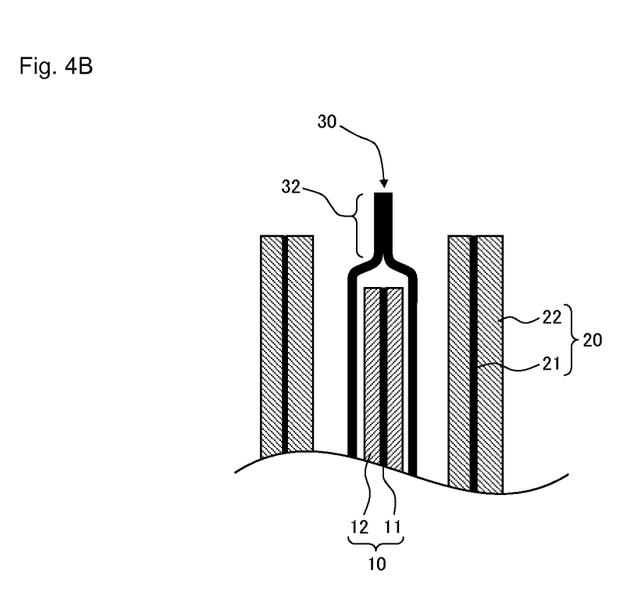
FIG. 4B is a schematic sectional view taken along line C-C' shown in FIG. 3A.

FIG. 2 is a plan view schematically showing a stacked lithium ion secondary battery according to the embodiment of the present invention. FIG. 3A is a plan view schematically showing the structure of the laminated body of the stacked lithium ion secondary battery shown in FIG. 2. FIG. 3B is a schematic sectional view taken along line A-A' shown in FIG. 3A. FIGS. 4A and 4B are schematic sectional views respectively taken along line B-B' and line C-C' shown in FIG. 3A. For simplicity, FIGS. 3A to 4B show only portions of a laminated body (and, in particular, FIG. 3A shows positive electrode and porous separator).

As shown in FIG. 2, stacked lithium ion secondary battery 1 according to the embodiment includes laminated body 2 in which a positive electrode and a negative electrode are stacked via a porous separator. Positive electrode collective tab 3 and negative collective tab 4 are respectively pulled out from the electrodes of laminated body 2. These tabs are welded and connected to pull-out terminals 5 and 6 in order to electrically connect the respective electrodes of the laminate body to an external device. Laminated body 2 is housed together with an electrolyte in laminate case 7.

As shown in FIGS. 3A to 4B, laminated body 2 includes positive electrode (first electrode) 10 in which positive electrode active material (first electrode active material) 12 has been applied to both surfaces of sheet-shaped positive electrode collector 11, and negative electrode (second electrode) 20 in which negative electrode active material (second electrode active material) 22 has been applied to both surfaces of sheet-shaped negative electrode collector 21.

In the embodiment, positive electrode collector 11 is made of aluminum foil, and positive electrode active material 12 that is made of lithium-containing oxide such as lithium manganese oxide ($LiMn_2O_4$) for absorbing and desorbing lithium ions is applied to the aluminum foil to form positive electrode 10. As shown in FIG. 3A, in positive electrode collector 11, active material forming region (first region) 11a to which positive electrode active material 12 has been applied and positive electrode collective tab (second region) 11b to which positive electrode active material 12 has not been applied are formed. Positive electrode collective tab 11b is disposed to be projected from the end of active material forming region 11a, i.e., to be pulled out from active material forming region 11a. On the other hand, negative electrode collector 21 is made of copper foil, and negative electrode active material 22 that is made of a carbon material such as graphite for absorbing and desorbing lithium ions is applied to the copper foil to form negative electrode 20. Negative electrode 20 also includes a negative electrode collective tab (not shown in FIGS. 3A to 4B) disposed to be pulled out from a region to which negative electrode active material 22 has been applied.

Between positive electrode 10 and negative electrode 20, porous separator 30 having, for example, a single layer structure of polypropylene or three-layer structure of polypropylene/polyethylene/polypropylene is inserted for the purpose of insulating positive electrode 10 and negative electrode 20.

In the embodiment, porous separator 30 includes folded portion 31 formed by folding porous separator 30 into a plurality of layers (two layers in the embodiment) between positive electrode collective tab 11b of positive electrode 10 and the region of negative electrode 20 to which negative electrode active material 22 has been applied. In other words, in porous separator 30 of the embodiment, a portion facing region 11b to which positive electrode active material 12 of positive electrode 10 has not been applied and region 11a to which negative electrode active material 22 of negative electrode 20 has been applied is folded into a plurality of layers to form folded portion 31. Thus, in the embodiment, even when negative electrode active material 22 is shed from negative electrode 20, folded portion 31 prevents the shed negative electrode active material from reaching positive electrode collector 11. In other words, folded portion 31 of porous separator 30 enhances insulation between positive electrode 10 (positive electrode collector 11) and negative electrode 20 (negative electrode active material 22), thus preventing short circuit between the electrodes. In the embodiment, as shown in FIG. 3A, folded portion 31 is formed along one side of rectangular porous separator 30. However, folded portion 31 can be formed only in the region of porous separator 30 facing positive electrode 11b.

Further, in porous separator 30, as shown in FIGS. 3A, 4A, and 4B, peripheral edges facing each other outside active material forming region 11a of positive electrode collector 11 are thermally welded to each other (and at peripheral edges where folded portions 31 have been formed, folded portions 31 that do not face positive electrode collective tab 11b are thermally welded to each other). Welded portion 32 is thus formed at the peripheral edges of porous separator 30, thereby forming porous separator 30 adjacent to positive electrode 10 into a bag shape to house active material forming region 11a of positive electrode collector 11, i.e., to actually house positive electrode 10. This configuration facilitates maintenance of the shape of porous separator 30 even when porous separator 30 contracts due to external or internal factors. Thus, the occurrence of short circuits between the electrodes can be more effectively and reliably prevented.

Preferably, folded portion 31 of porous separator 30 is nonporous, more specifically, is partially heat-treated to be nonporous. Because, the heat treatment covers porous holes of folded portion 31, and thus insulation properties are further improved. This provides greater certainty that the occurrence of short circuits between the electrodes can be prevented.

Next, referring to FIGS. 2 to 4B, a method for manufacturing the stacked lithium ion secondary battery of the embodiment will be described.

First, positive electrode material 12 made of lithium-containing oxide is intermittently applied to rolled aluminum foil. Then, the aluminum foil is processed into a sheet shape so that a portion having positive electrode active material 12 applied thereto can be active material forming region 11a and a portion having no positive electrode active material 12 applied thereto can be positive electrode collective tab 11b, thereby forming positive electrode collector 11. Thus, positive electrode 10 where one or a plurality of (one in the embodiment) positive electrode collective tabs 11b is pulled out is formed. Similarly, rolled copper foil to which negative electrode active material 22 that is made of a carbon material has intermittently been applied is processed into a sheet shape to form negative electrode 20 where a negative electrode collective tab (not shown in FIGS. 3A and 3B) is pulled out.

Positive electrode 10 and negative electrode 20, which have been formed, are stacked via porous separator 30 having the single layer structure of polypropylene or three-layer structure of polypropylene/polyethylene/polypropylene to form laminated body 2.

Specifically, first, the portion of porous separator 20 that faces the region where the aluminum foil of positive electrode collector 11 is exposed (positive electrode collective tab 11b) and the region of negative electrode 20 to which negative electrode active material 22 has been applied is folded into a plurality of layers to form folded portion 31. Then, folded portion 31 is heat-treated (thermally welded) to be nonporous. Then, in porous separator 30 adjacent to positive electrode 10, the peripheral portions facing each other that are outside active material forming region 11a of positive electrode collector 11 are thermally welded to form welded portion 32. Porous separator 30 adjacent to positive electrode 10 is accordingly formed into a bag shape to house active material forming region 11a of positive electrode collector 11. Positive electrode 10, which is actually housed in portion separator 30 that has been formed into the bag shape, and the negative electrode are stacked to form laminated body 2.

Positive electrode pull-out terminal 5 and negative electrode pull-out terminal 6 are connected to laminated body 2 thus formed. Then, as shown in FIG. 2, laminated body 2 is housed in laminate case 7 that is made of a laminate film formed by stacking a synthetic resin film on both surfaces of a thin metal film such as aluminum foil. Specifically, to expose parts of pull-out terminals 5 and 6 to the outside of laminate case 7, laminated body 2, positive electrode collective tab 3, negative electrode collective tab 4, and parts of pull-out terminals 5 and 6 are inserted between two rectangular laminate films, and the respective sides of the laminated film are thermally welded. At this time, after three sides that include a side where pull-out terminals 5 and 6 are arranged, are thermally welded, electrolyte is injected into the laminated film in the state of the bag shape, and lastly the remaining side is thermally welded to form stacked lithium ion secondary battery 1.

Methods for manufacturing the porous separator is largely classified into a wet method and a dry method. In the embodiment, a porous separator formed by the dry method is preferably used. Because, for manufacturing reasons, the thermal contraction of the porous separator formed by the dry method is smaller than that of the porous separator formed by the wet method, and contraction of or wrinkles in the porous separator caused by heat treatment during manufacturing can be prevented.

As described above, in the stacked lithium ion secondary battery according to the embodiment, in the porous separator inserted between the positive electrode and the negative electrode, the folded portion is formed by folding the porous separator into a plurality of layers. The folded portion is disposed in the portion facing the region of the positive electrode to which the positive electrode active material has not been applied, i.e., the region where the positive electrode collector is exposed, and in the portion facing the region of the negative electrode to which the negative electrode active material has been applied. Thus, even when the negative electrode active material is shed from the negative electrode, the shed negative electrode active material is prevented from reaching the positive electrode collector. As a result, the insulation between the electrodes can be enhanced to prevent short circuit in the battery.

The stacked secondary battery according to the present invention has been described by taking the example of the stacked lithium ion secondary battery. The present invention, however, is not limited to this example and can be applied to an electrochemical device capable of storing charges, for example, other secondary batteries such as a nickel hydride battery, or an electrochemical capacitor represented by an electric double layer capacitor.

The present invention can be advantageously used as an uninterruptible power source or a storage battery, and further as an electric vehicle battery, a hybrid vehicle battery, or a power-assisted bicycle battery.

Example

The inventors examined the effect in which an internal short circuit is prevented due to the folded portion of a porous separator in a stacked lithium ion battery manufactured using the above-described method under the conditions described below.

A porous separator having a three-layer structure of polypropylene/polyethylene/polypropylene layers was used as a separator for insulating a positive electrode and a negative electrode. The folded portion of the porous separator was formed into a two-layer structure, and thermally welded at 160° C. to be nonporous. Ten positive electrodes, 20 separators, and 11 negative electrodes were used for the laminated body.

A positive electrode pull-out terminal was made of aluminum with a width of 10 mm and a thickness of 0.2 mm, a positive electrode collective tab was formed with a width of 10 mm and a thickness of 0.02 mm, and these were connected by ultrasonic welding. A negative electrode pull-out terminal was made of nickel with a width of 10 mm and a thickness of 0.2 mm, a negative electrode collective tab was formed with a width of 10 mm and a thickness of 0.01 mm, and these were connected by ultrasonic welding. An insulating resin having a thickness of 0.1 mm was inserted between the pull-out terminal and a laminate film, and the laminate film was thermally welded so that the welding position of the laminate film could overlap the insulating resin to form a laminate case.

As a Comparative Example, the inventors manufactured a stacked lithium ion secondary battery similar in configuration to that of the Example except for nonformation of the folded portion.

In the Example and the Comparative Example, the inventors checked for the presence of internal short circuit by applying pressure to the folded portion in the Example and to the corresponding position in the Comparative Example from the outside via a metal piece (length of 2 mm, width of 0.2 mm, and thickness of 0.1 mm) folded by 90° at the center.

Internal short circuit occurred in the Comparative Example. However, in the Example, not internal short circuit was found, and thus the effect in which the folded portion is able to prevent the occurrence of internal short circuits was confirmed.

While the present invention has been described with reference to the embodiment and the example, the present invention is not limited to the embodiment and the example described above. It will be understood by those skilled in the art that various changes in form and details may be made therein without departing from the scope of the present invention as defined by the claims.

The present application is based upon and claims the benefit of priority from Japanese Patent Application No. 2010-207924 filed on Sep. 16, 2010, the disclosure of which is incorporated herein in its entirety by reference.

EXPLANATION OF REFERENCE NUMERALS

1 Stacked lithium-ion secondary battery
2 Laminated body
10 Positive electrode
11 Positive electrode collector
11a Active material forming region
11a Positive electrode collective tab
12 Positive electrode active material
20 Negative electrode
21 Negative electrode collector
22 Negative electrode active material
30 Porous separator
31 Folded portion
32 Welded portion

The invention claimed is:

1. A stacked secondary battery comprising:
a laminated body, the laminated body comprising:
a plurality of first electrodes, each of which comprises a first sheet-shaped collector and a first electrode active material that is applied to both surfaces of the first sheet-shaped collector;
a plurality of second electrodes, each of which comprises a second sheet-shaped collector and a second electrode active material different in polarity from the first electrode active material, that is applied to both surfaces of the second sheet-shaped collector; and
a plurality of porous separators, the first electrodes and the second electrodes being alternately stacked via the porous separators,
wherein each of the first electrodes comprises a first region to which the first electrode active material has been applied and a second region to which the first electrode active material has not been applied,
wherein an area of the first region of at least one of the first electrodes is smaller than an area of a region of at least one of the second electrodes to which the second electrode active material has been applied, and
wherein each of the porous separators comprises a first portion that is disposed at a peripheral edge of the porous separator and that is folded into a plurality of layers and a second portion other than the first portion that is made of a single layer, and at least a portion of the first portion faces the second region of the at least one of the first electrodes and the region of the at least one of the second electrodes to which the second electrode active material has been applied and is located between the second region the at least one of the first electrodes and the region of the at least one of the second electrodes to which the second electrode active material has been applied.

2. The stacked secondary battery according to claim 1, wherein at least the portion of the first portion of the porous separator is nonporous.

3. The stacked secondary battery according to claim 1, wherein:
   the second region of the at least one of the first electrodes is disposed to project from an end of the first region; and
   the porous separators adjacent to the at least one of the first electrodes, peripheral edges of which face each other outside the first region of the at least one of the first electrodes and which are thermally welded, are formed into a bag shape to house the first region of the at least one of the first electrodes.

4. The stacked secondary battery according to claim 3, wherein the at least one of the first electrodes is a positive electrode.

* * * * *